United States Patent
Barnes et al.

(10) Patent No.: US 11,458,654 B2
(45) Date of Patent: Oct. 4, 2022

(54) METHOD OF MANUFACTURING A COMPOSITE COMPONENT

(71) Applicant: Rolls-Royce plc, London (GB)

(72) Inventors: Ashley Barnes, Derby (GB); James A. Lee, Derby (GB); Matthew Hocking, Bristol (GB); Edward Goodman, Bristol (GB); Peter Calvert, Derby (GB)

(73) Assignee: Rolls-Royce plc, London (GB)

( * ) Notice: Subject to any disclaimer, the term of this patent is extended or adjusted under 35 U.S.C. 154(b) by 623 days.

(21) Appl. No.: 15/741,158

(22) PCT Filed: Jul. 4, 2016

(86) PCT No.: PCT/GB2016/052016
§ 371 (c)(1),
(2) Date: Dec. 29, 2017

(87) PCT Pub. No.: WO2017/006099
PCT Pub. Date: Jan. 12, 2017

(65) Prior Publication Data
US 2018/0194040 A1    Jul. 12, 2018

(30) Foreign Application Priority Data
Jul. 3, 2015 (GB) .................. 1511706

(51) Int. Cl.
*B29C 35/02* (2006.01)
*B29C 70/38* (2006.01)
*B29C 70/32* (2006.01)

(52) U.S. Cl.
CPC ...... *B29C 35/0288* (2013.01); *B29C 35/0227* (2013.01); *B29C 35/0266* (2013.01);
(Continued)

(58) Field of Classification Search
CPC ..... B29C 35/0288; B29C 70/30; B29C 70/38; B29C 70/386; B32B 37/06
See application file for complete search history.

(56) References Cited

U.S. PATENT DOCUMENTS 5,078,592 A    1/1992  Grimshaw et al.
5,177,340 A    1/1993  Zaffiro et al.
(Continued)

FOREIGN PATENT DOCUMENTS

EP    2623301       8/2013
EP    2623301 A1    8/2013
(Continued)

OTHER PUBLICATIONS

"Japanese Application Serial No. 2017-567773, Office Action dated Nov. 26, 2019", w/ English Translation, 8 pgs.
(Continued)

*Primary Examiner* — Jacob T Minskey
*Assistant Examiner* — S. Behrooz Ghorishi
(74) *Attorney, Agent, or Firm* — Schwegman Lundberg & Woessner, P.A.

(57) ABSTRACT

There is disclosed a method of manufacturing a composite component, the method comprising laying-up a plurality of successive plies of composite material to produce a pre-form (12) for the component in a lay-up procedure, wherein a portion of each ply of composite material is heated to at least a threshold temperature of 45° C. during a period of the lay-up procedure.

18 Claims, 3 Drawing Sheets

(52) U.S. Cl.
CPC .............. *B29C 70/32* (2013.01); *B29C 70/38* (2013.01); *B29C 70/386* (2013.01); *B29C 2791/001* (2013.01)

(56) References Cited

U.S. PATENT DOCUMENTS

| | | | |
|---|---|---|---|
| 5,288,357 A * | 2/1994 | Yamada | B29C 35/0288 156/249 |
| 2005/0039842 A1 | 2/2005 | Clark et al. | |
| 2005/0274446 A1 | 12/2005 | Evans | |
| 2007/0187021 A1 | 8/2007 | Oldani et al. | |
| 2014/0110875 A1 | 4/2014 | Khan | |

FOREIGN PATENT DOCUMENTS

| | | |
|---|---|---|
| JP | H04308733 | 10/1992 |
| JP | 2014519995 | 8/2014 |
| JP | 2015089647 | 5/2015 |
| WO | WO-03/047845 A1 | 6/2003 |
| WO | 2008120505 | 10/2008 |

OTHER PUBLICATIONS

International Application No. PCT/GB2016/052016, International Search Report and Written Opinion dated Sep. 22, 2016, 11 pgs.
United Kingdom Application No. 1511706.2, Search Report dated Dec. 10, 2015, 4 pgs.
"Chinese Application Serial No. 201680039278.7, First Office Action dated Aug. 26, 2019", w/ English Translation, 9 pgs.

* cited by examiner

METHOD OF MANUFACTURING A COMPOSITE COMPONENT

CROSS-REFERENCE TO RELATED APPLICATIONS

This application is a U.S. National Stage Filing under 35 U.S.C. 371 from International Application No. PCT/GB2016/052016, filed on Jul. 4, 2016, and published as WO 2017/006099 A1 on Jan. 12, 2017, which claims the benefit of priority under 35 U.S.C. § 119 to United Kingdom Patent Application No. 1511706.2, filed on Jul. 3, 2015, each of which is hereby incorporated by reference herein in its entirety.

BACKGROUND

The invention relates to a method of manufacturing a composite component in which, in a layup procedure, a portion of each ply of composite material is heated to a threshold temperature of at least 45° C.

Composite materials are increasingly used for components that require particular combinations of material properties. In particular, composite materials such as Carbon Fibre Reinforced Polymer (CFRP) are commonly used for components in the aerospace and other industries due to their high stiffness and low weight. Composite materials typically comprise a reinforcement material (such as carbon fibre) and a matrix material (such as epoxy resin).

There are several known methods for automatically laying up composite material for a component, including Automatic Fibre Placement (AFP) and Automatic Tape Laying (ATL). In AFP, several individual fibres of composite material are gathered to form a tow, and the tow is laid over a tool and periodically cut to form a course of composite material. A narrow width of tape could be used instead of individual fibres or tows. In ATL, a wider tape is applied directly to the tool over a course.

Typically, once composite material is layed-up to produce a pre-form, the pre-form is typically formed to the desired shape (if necessary), and the composite material is cured to form the component.

It is known that spaces between the individual pieces of composite material affect the shape and size of the pre-form during the manufacturing process. For example, spaces form where there are gaps and overlaps between individual tows (in Automatic Fibre Placement, AFP), and between courses of tows. Further, there are spaces owing to the roughness and profile of the composite material as it is deposited.

When a pre-form for a composite component is cured under temperature and pressure, such spaces are eliminated as the resin (or matrix material) in the composite material becomes less viscous and the pre-form is consolidated. Any air (or other gas) in such spaces migrates out of the pre-form during curing.

Accordingly, before curing, a pre-form typically has extra volume when compared to the volume of the cured component. The extra volume is referred to as pre-form bulk, or simply "bulk". Although this bulk is typically removed during curing, it is desirable to minimise bulk in a pre-form. For example, it may not be possible to insert the pre-form into a mould for curing owing to bulk. This problem is particularly relevant for low tolerance applications, such as high-value advanced manufacturing, an example being components for the aerospace industry.

Current manufacturing process typically result in excessive bulk, which requires remedial de-bulking processes to be employed. A number of de-bulking processes are known, which typically rely on subjecting the pre-form to a pressure-load (i.e. using a vacuum bag and/or pressure vessel), and heating the pre-form. However, such processes are typically time consuming, error-prone, manual and correspondingly expensive.

It is therefore desirable to provide an improved method of manufacturing a pre-form for a composite component.

SUMMARY

According to a first aspect of the invention there is provided a method of manufacturing a composite component, the method comprising laying-up a plurality of successive plies of composite material to produce a pre-form for the component in a lay-up procedure, wherein a portion of each ply of composite material is heated to at least a threshold temperature of 45° C. during a period of the lay-up procedure. A portion of each ply of composite material may be heated using a heating apparatus.

The threshold temperature may be at least 50° C., or at least 55° C.

The portion of each ply which is heated to at least the threshold temperature may correspond to a portion of the component having a greater thickness relative to the mean thickness of the component. For example, the portion may correspond to a root portion of a fan blade. Alternatively, the heating apparatus may be controlled so that the temperature of each ply in substantially all or all of the pre-form is at or above the threshold temperature for at least a period of the lay-up surface (in other words, the portion may constitute the entire pre-form).

The heating apparatus may be operated so that the temperature of each ply is at least the threshold temperature for at least a pre-determined de-bulk period during the lay-up procedure.

The de-bulk period may be at least 10 seconds, at least 30 seconds, at least one minute, at least two minutes, at least five minutes, at least 10 minutes or more. The period may correspond to the period required for at least one, at least two, or at least three or more passes of an applicator roller over the portion. The period may correspond to the period required for at least one, at least two, at least three or more successive plies of material to be layed-up over the respective ply.

The heating apparatus may be operated so that the temperature of the respective portion of each ply reaches the threshold temperature within a heating period of less than 5 minutes from application of the composite material, less than 2 minutes, less than 1 minute, less than 30 seconds, less than 10 seconds, less than 5 seconds or less than 2 seconds. In other words, the heating apparatus may be operated so that the de-bulk period for each ply occurs within shortly after application of the composite material. Accordingly, the respective portion of each ply reaches the threshold temperature in-situ on the tool whilst the lay-up procedure is on-going, and the de-bulk period begins whilst the lay-up procedure is on-going. Accordingly, it is not necessary to wait for the lay-up procedure to end to de-bulk the material.

The heating apparatus may be operated so that the temperature of each ply is no more than 60° C. for the duration of the lay-up procedure.

The heating apparatus may be controlled to heat the pre-form during the lay-up procedure by heat transfer from the tool to the pre-form. The heating apparatus may be controlled to heat the pre-form during the lay-up procedure by heat transfer from a side of the pre-form opposite the tool.

For example, where the pre-form is layed-up substantially on top of (i.e. above) the tool, the heating apparatus may be controlled to heat the pre-form during the lay-up procedure by heat transfer from above the tool.

The heating apparatus may have a first heater configured to heat the pre-form during the lay-up procedure by heat transfer from the tool to the pre-form, and a second heater configured to heat the pre-form during the lay-up procedure by heat transfer from a side of the pre-form opposite the tool. The heating apparatus may be operated during the layup procedure to heat the pre-form in a first heating phase in which a thickness of the pre-form is less than a threshold thickness or a number of plies is less than a threshold limit, and subsequently in a second heating phase in which the pre-form has a thickness greater than or equal to the threshold thickness or a number of plies greater than or equal to the threshold limit. In the first heating phase only one of the first heater and the second heater may be active, and in the second heating phase at least the second heater may be active.

In the second heating phase the first heater may be inactive. In the first heating phase only the first heater may be active. In the second heating phase both the first heater and the second heater may be active.

In a further embodiment, the temperature of the pre-form may be monitored during the layup procedure and the heating apparatus may be operated during the layup procedure to heat the pre-form in a first heating phase in which only the first heater is active until the monitored temperature falls below a threshold, for example 45° C. (i.e. the same as the threshold temperature), and the heating apparatus may subsequently be operated during the layup procedure to heat the pre-form in a second heating phase in which at least the second heater is active and the heater may be controlled so that the monitored temperature remains at or above 45° C. Both the first and second heater may be active during the second phase, or the second heater alone may be active.

The method may further comprise monitoring the temperature of the pre-form during the lay-up procedure. The temperature of the pre-form may be monitored using a pyrometer. The heating apparatus may be controlled at least partly based on monitoring the temperature of the pre-form during the lay-up procedure.

The heating apparatus may comprise a heater element coupled to the tool and configured to heat the tool. The heater element may form part of the first heater.

The heating apparatus may comprise a non-contact heater. The non-contact heater may be a convective heater or a non-contact heater, such as an infrared (IR) heater. The non-contact heater may form part of the second heater. The non-contact heater may be selectively activated and/or controlled based on the temperature of the pre-form. The non-contact heater may be selectively activated and/or controlled based on monitoring a temperature of the pre-form, such as the surface temperature of the pre-form.

The plies of composite material may be layed-up using an applicator head, and the applicator head may move relative to the non-contact heater during the layup procedure. The non-contact heater may be controlled to move during the lay-up procedure based on the proximity of the applicator head to the non-contact heater.

The non-contact heater may be coupled to a proximity sensor configured to determine when the applicator head is within a threshold proximity of the non-contact heater, and wherein the non-contact heater is controlled to move based on an output of the proximity sensor.

The method may further comprise controlling the movement of the non-contact heater based on a predetermined path of the applicator head.

The method may comprise heating side-surfaces of the pre-form. The side surfaces may be defined by the edges of the plies. The heating apparatus may comprise a heater element for heating the side-surfaces of the pre-form, which may be coupled to a side-surface of the tool, or may be moveable into position adjacent the pre-form.

According to a second aspect of the invention there is provided a method of manufacturing a pre-form for a composite component, comprising laying-up a plurality of successive plies of composite material on a tool in a lay-up procedure to progressively produce the pre-form, in which an applicator head moves over the tool; and heating the pre-form using a heating apparatus comprising a non-contact heater; wherein the applicator head moves relative to the non-contact heater.

According to a third aspect of the invention there is provided composite material lay-up equipment comprising: a tool for receiving a plurality of plies of composite material in a lay-up procedure to form a pre-form for a composite component; an applicator head for laying-up the plies of composite material; and a heating apparatus for heating the pre-form on the tool, the heating apparatus comprising a non-contact heater; wherein the applicator head is moveable relative to the non-contact heater.

According to a fourth aspect of the invention there is provided composite material lay-up equipment comprising: a tool for receiving a plurality of successive plies of composite material in a lay-up procedure to form a pre-form for a composite component; a heating apparatus for heating the pre-form on the tool; and a controller configured to control the heating apparatus so that a portion of each ply of composite material is heated to at least the threshold temperature of 45° C. during a period of the lay-up procedure.

The equipment may further comprise a temperature sensor configured to generate a signal relating to the temperature of the pre-form during the lay-up procedure. The controller may be configured to control the heating apparatus based on the output of the temperature sensor.

The controller may be configured to control the heating apparatus so that the temperature of a portion of each ply of composite material forming the pre-form is at or above the threshold temperature for at least a period of the lay-up procedure. The temperature sensor may be a pyrometer.

The equipment may further comprise a proximity sensor configured to determine when the applicator head is within a threshold proximity of the non-contact heater, and the equipment may be arranged to move the non-contact heater based on an output of the proximity sensor.

The non-contact heater may be suspended above and/or around the tool. The non-contact heater may be spaced apart from the tool and the pre-form.

The heating apparatus may comprise a non-contact heater, and the applicator head may be moveable relative to the non-contact heater.

The non-contact heater may be configured to move during the lay-up procedure based on the proximity of the applicator head to the non-contact heater.

The heating apparatus may comprise a heater element configured to heat the tool so that in use heat is transferred from the tool to the pre-form.

A controller may be configured to control the movement of the non-contact heater based on a predetermined path of the applicator head. The non-contact heater may be mounted on a pivotable support arm.

The invention will now be described with reference to the following drawings, in which:

DETAILED DESCRIPTION

Figure 1:
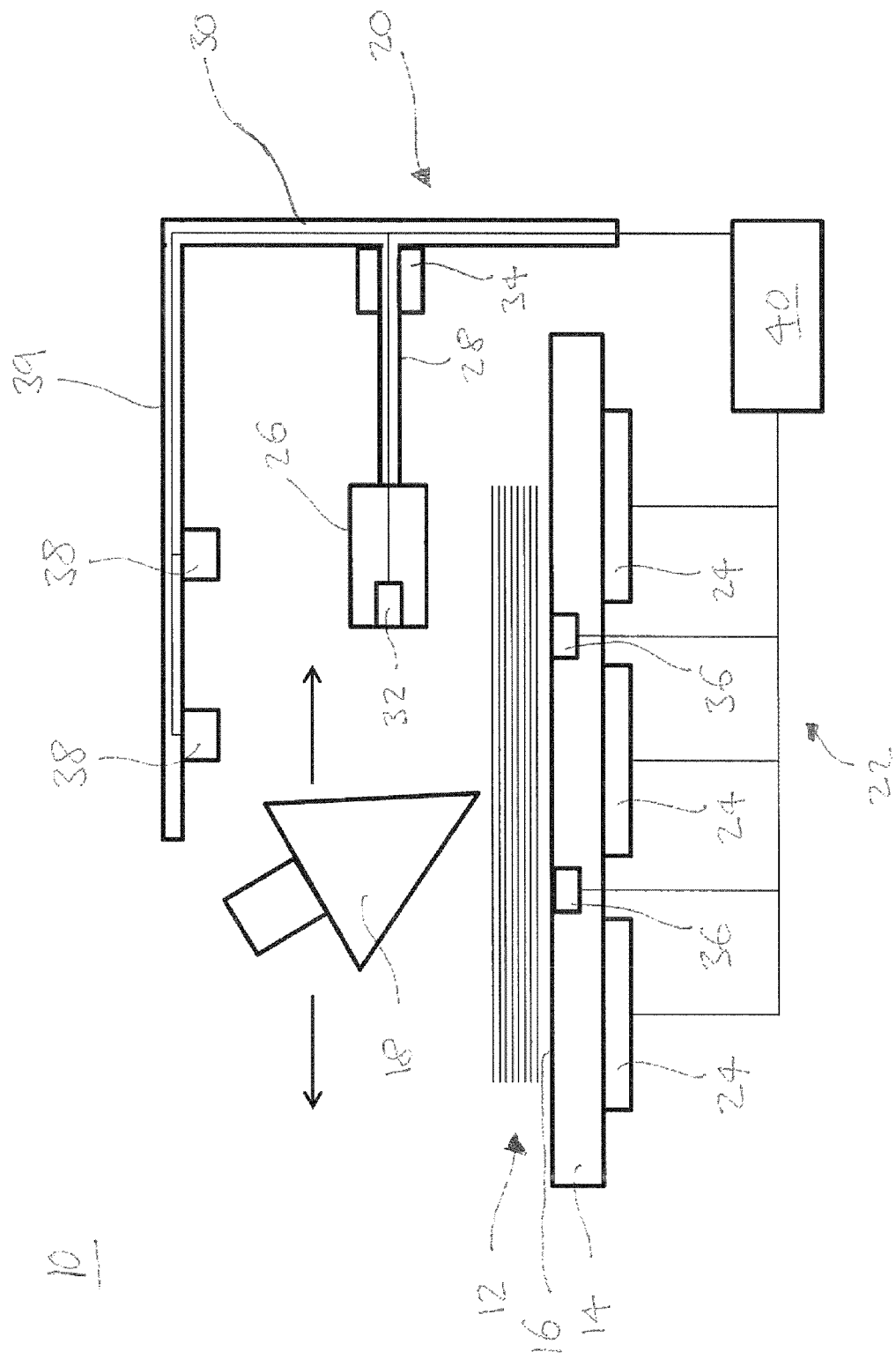
FIG. 1 shows composite material lay-up equipment.

FIG. 1 shows composite material lay-up equipment 10 for laying-up a plurality of plies of composite material to form a pre-form 12 for a composite component. The equipment 10 comprises a tool 14 having a lay-up surface 16 and an applicator head 18 configured to traverse over the tool 14 to apply composite material onto the tool.

The applicator head 18 is suspended over the tool 14, for example by a gantry or other support structure such as a robotic arm. The applicator head 18 and tool 14 are configured for relative movement with respect to each other through multiple degrees of freedom. In this particular embodiment the tool 14 is configured to remain stationary and the applicator head 18 is configured to move relative the tool in three translational degrees of freedom, and is also configured to pivot about three axes (and thereby has six degrees of freedom). In other embodiments, both the tool 14 and applicator head 18 or the tool 14 alone may be configured to move.

The equipment 10 further comprises a heating apparatus 20 comprising a first heater 22 having a plurality of heating elements 24 mounted to the obverse side of the tool 14 (i.e. the side of the tool 14 opposite the lay-up surface 16), and a second heater 26.

The first heater 22 is configured to heat the tool 14 so that in use during the lay-up procedure heat is transferred from the heater 22 to the tool 14, and from the tool 14 to the pre-form 12. The first heater 22 is coupled to a controller 40 via a wired or wireless link. The controller 40 is configured to control the heating apparatus 20, as will be described in detail below.

The second heater 26 is suspended over the tool 14 on a heater support arm 28 coupled to a support structure 30. In this embodiment, the support structure 30 is a free-standing post adjacent the tool configured to support the support arm 28 and other auxiliary equipment. However, in other embodiments the support structure 30 may be coupled directly to the tool 14 or integral with the tool, or may extend from a overhead gantry or the like. The second heater 26 is a non-contact heater, and in this embodiment it is a radiative heater, in particular an infrared heater configured to direct infrared rays towards the tool 14 and the pre-form 12 progressively formed thereon. The second heater 26 further comprises a proximity sensor 32 configured to detect when the applicator head 18 is within a threshold proximity of the second heater 26. In this embodiment, the proximity sensor 32 is an infrared sensor, but in other embodiments it may be any suitable type of sensor. The second heater 26 is coupled to the controller 40 via a wired or wireless link. The second heater 26 may further comprise a mirror for reflecting the radiative energy towards the tool 14, which may be articulated and controlled by a controller of the heater 26 to direct the radiative energy appropriately.

The heater support arm 28 is articulated at the junction with the support structure 28 and there is an actuator 34 for rotating the support arm 28, and thereby the second heater 26, about a vertical axis with respect to the support structure 30. The actuator 34 is also coupled to the controller 40.

The equipment 10 comprises temperature sensing apparatus including a first set of temperature sensors 36 (first temperature sensors) coupled to the tool 14 for monitoring the temperature of the tool and/or the pre-form, and a second set of sensors 38 (second temperature sensors) suspended above the tool 14 for remotely monitoring the temperature of the tool and/or the pre-form. In this embodiment the first set of sensors 36 comprises two temperature sensors 36 embedded in the tool 14, in particular, in recesses within the lay-up surface 16 of the tool 14 so that the sensors 36 are spaced apart from the first heater 22. The sensors 36 are configured to directly monitor the temperature of the tool 14 as heated by the first heater 22.

The second temperature sensors 38 are suspended from a sensing arm 39 mounted on the support structure 30. The second sensors 38 are pyrometers configured to remotely monitor the temperature of the tool 14, or the pre-form 12 when the pre-form 12 is disposed on the tool 14 (i.e. as it is progressively formed by the applicator head 18).

The first and second sensors 36, 38 are coupled to the controller 40, via wired or wireless links. In other embodiments, at least one temperature sensor may be mounted on an applicator head.

Figure 2:
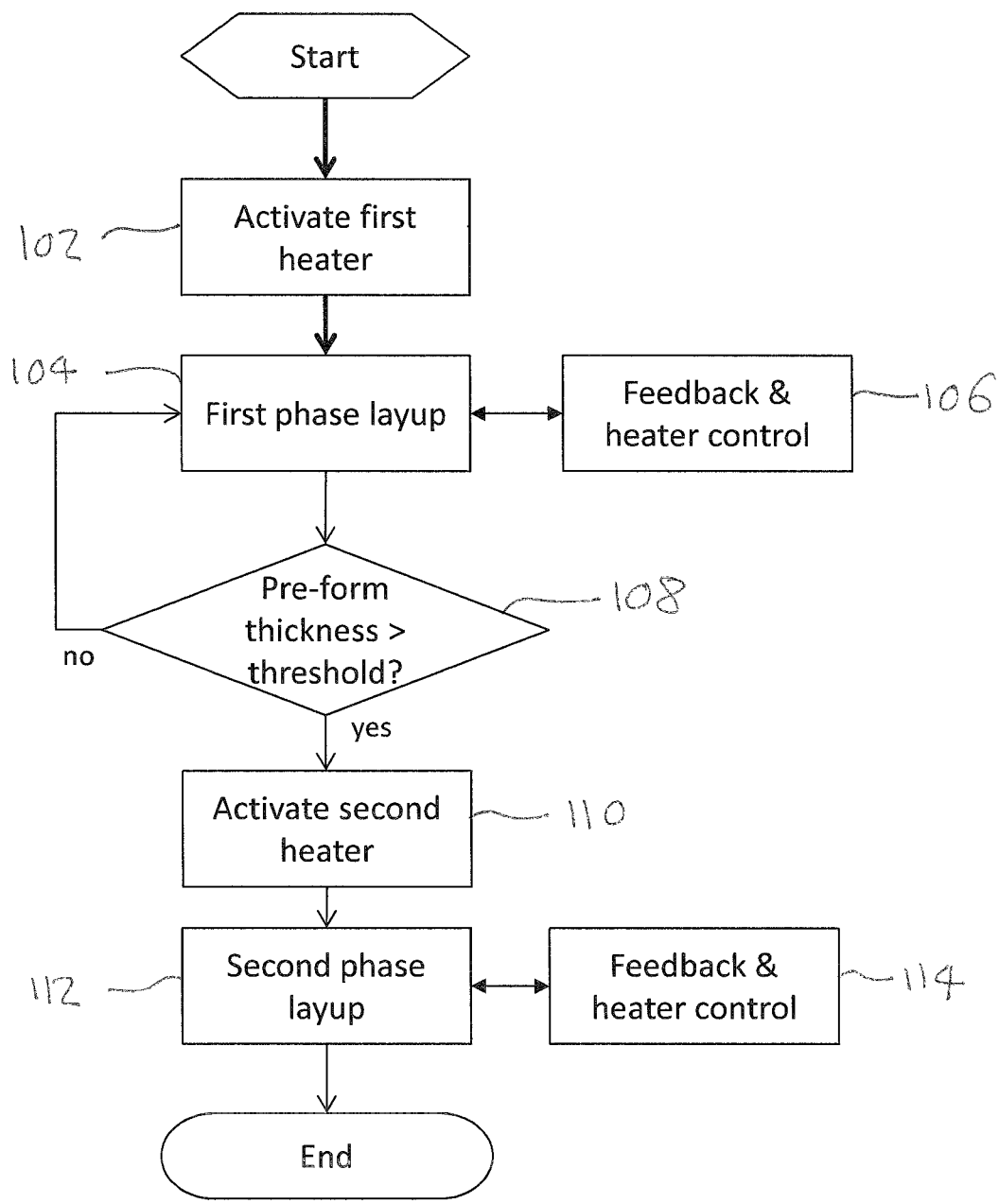
FIG. 2 shows a lay-up procedure in accordance with the invention.

An example of method of laying up a pre-form using the equipment 10 will now be described, by way of example, with reference to FIG. 2.

In a preparation phase before a layup procedure begins, the controller 40 sets the first heater 22 in an active state and deactivates the second heater 26 to initiate the heating apparatus (102). The controller 40 heats the heater mats 24 of the heater 22 so that the first temperature sensors 36 return a tool temperature of 45° C., using any suitable control algorithm (such as PID control (Proportional-Integral-Derivative)).

A first phase of the layup procedure (104) is initiated by causing the applicator head 18 to traverse the tool 14 to lay-up successive plies of composite material. In this embodiment, the applicator head 18 heats the composite material to a temperature of approximately 30° C. before it is applied to the tool 14, as is known in the art so as to render the composite material suitably tacky. Upon application to the tool 14, heat is transferred from the tool into the composite material and the temperature of the composite material is raised to 45° C.

The controller 40 continuously conducts a feedback and heater control loop (106) during the first phase of the layup procedure (104) by which the temperature of the composite material that has been applied to the tool 14 during the layup procedure is monitored using the pyrometers (or second sensors) 38, and the power supplied to the heater mats 24 adjusted by a suitable control algorithm (e.g. PID control) so that each ply of composite material reaches 45° C. before the subsequent ply is applied. In this embodiment, the pyrometers 38 are configured to monitor the temperature over substantially the entire extent of each ply, but in other embodiments the pyrometers may be configured to take point-readings only, which may be considered representative of the temperature reading over the ply. Alternatively, the or each pyrometer may be controllably-directed to take point-readings over a designated portion or substantially the entire extent of each ply in a scanning operation. Further, in other embodiments, there may be a pyrometer mounted to the applicator head 18 which may take readings of each point at the frequency that the head traverses the ply.

It will be appreciated that, in embodiments, the controller 40 may be configured to provide differential heating over the tool to compensate for a temperature gradient over a ply as monitored by the pyrometers 38.

The first phase of the lay-up procedure continues by laying additional plies. The controller monitors the lay-up procedure to determine once the pre-form has reached a threshold thickness or threshold number of plies (108). In this example embodiment, the pre-form is for a composite fan blade having a thick root region and a thinner blade region. During the lay-up procedure, more plies are applied in the root region than the blade region in order to build up the thicker root region. The cross-section of the plies shown in FIG. 1 corresponds to the root region.

The controller 40 is configured to interpret the head path provided to the applicator head 18 and determine the thickness of the various regions of the pre-form as it is built up. In this example embodiment, the maximum thickness of the root region of the completed pre-form is approximately 90 mm, and the maximum thickness of the blade region of the completed pre-form is approximately 40 mm. A threshold thickness of 45 mm is set in the controller 40, and the controller 40 determines when the thickness of the pre-form in the root region reaches this thickness by interpreting the head path followed by the applicator 18 to lay-up the composite material.

Once the controller 40 determines that the thickness of the root region has reached the threshold thickness, the controller 40 activates the second heater 26 (110) so as to heat the composite material applied to the tool 14 indirectly (i.e. using infrared waves). In this embodiment, the second heater 26 is mounted directly above the root region of the pre-form, but in other embodiments, the second heater 26 may be configured to move to different locations depending on the heat requirement, and may be able to direct the heating output (i.e. the direction of the infrared waves) in directions determined by the controller 40 accordingly.

In the second phase of the lay-up procedure, the applicator head 18 continues to apply successive plies of composite material to the tool to progressively form the pre-form (112). The controller 40 operates a further feedback and heater control loop (114) in which the pyrometers 38 monitor the temperature of the composite material applied to the tool, and adjusts the heat output of the first and second heaters so that each successive ply reaches a temperature of 45° C. before the following ply is applied.

The applicant has found that heating from above and below reduces the temperature gradient through the pre-form and therefore prevents plies adjacent the heat source becoming excessively heated.

In other embodiments, the controller 40 may initiate the second phase of the lay-up procedure when it is determined that the temperature of at least a portion of the upper surface of the pre-form is below a predetermined second-phase threshold, such as 45° C.

In the first phase of the lay-up procedure, all heating is conducted from the tool into the pre-form. Accordingly, whilst each new ply is being successfully heated to at least 45° C., it can be inferred that the underlying plies are also at a temperature of at least 45° C. Accordingly, the controller 40 can determine the time that at least a portion of each ply is at a temperature of 45° C. or more by evaluating the time from when it first reached 45° C. to the end of the first phase of the lay-up procedure.

In this embodiment, the controller 40 continues to operate the first heater 22 so that the first temperature sensors embedded in the layup surface 16 of the tool 14 return a temperature of 45° C. Accordingly, provided the uppermost plies reach a temperature of at least 45° C., it can be determined that the intervening plies are also at a temperature of at least 45° C. in at least a central portion of the ply, and the time that at least a portion of each ply is above 45° C. can be evaluated accordingly. In this embodiment, the sides of the pre-form are not insulated and so portions of each ply towards the side of the pre-form may lose heat to the environment and fall below 45° C. In other embodiments, heaters and/or insulation may be provided for heating the edges of the pre-form or preventing heat loss respectively.

As described above, in this embodiment the heater 26 is disposed above the root portion of the pre-form. The heater 26 is provided with a motion sensor 32 which determines when the applicator head 18 is within a predetermined proximity threshold, which in this embodiment is 50 mm. When this is determined, the motion sensor 32 communicates with the controller 40, which causes the actuator 34 to rotate the support arm 28 on which the heater 26 is mounted so as to move the heater 26 from its operational position (as shown in FIG. 1) to a retracted position out of the way of the applicator head 18. In the retracted position, the heat input to the pre-form provided by the second heater 26 is temporarily removed. The controller 40 is configured to periodically attempt to return the second heater 26 to the operative position. The controller 40 is also configured to interrupt returning the second heater 26 to the operative position if the motion sensor 32 determines that the applicator head 18 is within the threshold proximity.

Accordingly, the second heater 26 can be installed in place over the root region of the pre-form for providing indirect (i.e. radiative/non-contact) heating to the root region, but can automatically be moved out of the way of the applicator head 18 when necessary. In other embodiments, the controller 40 may be configured to move the second heater 26 out of the way of the applicator head 18 based on an analysis of the head path of the applicator head 18 and any conflict with the position of the second heater 26.

In an alternative embodiment, there may be a third phase of the layup procedure in which the first heater 22 is deactivated and the second heater 26 remains active. In such a third phase, the heat input to the pre-form is provided solely by the second heater 26. The controller 40 may continue to monitor the temperature at the surface of the tool 14 using the first temperature sensors 36, so that, in combination with the temperatures recorded by the second temperature sensors 38 (the pyrometers), a temperature gradient through the pre-form may be determined. Based on this, the controller 40 can determine the time period that each ply remains at a temperature of at least 45° C. A layup procedure having such a third phase may be useful where the total duration of the layup procedure is longer than a minimum pre-determined de-bulk period for which it is desired to maintain the temperature of each ply at or above 45° C., for example a de-bulk period of 5 minutes. For example, it may be undesirable to maintain the temperature of a ply above 45° C. for too long, for example greater than 1 hour, greater than 5 hours, greater than 10 hours, greater than 20 hours or greater than 50 hours, as the ply may begin to cure depending on the pressure applied to the pre-form by the applicator roller. Further, it may be undesirable to maintain the temperature of a ply above 45° C. for longer than is necessary to compact the ply (for example a period of longer than 5 minutes, longer than 10 minutes, longer than 30 minutes or longer than 1 hour) as this may result in excess resin bleeding (or migration) from the pre-form.

The applicant has found that maintaining the temperature of each ply of the pre-form at or above a threshold temperature of 45° C. reduces the bulk of the pre-form during the lay-up procedure, thereby minimising defects in the shape of the pre-form (and the corresponding cured component), and reducing the requirement for non-conformance activities (i.e. de-bulking activities after the lay-up procedure is complete).

Figure 3:
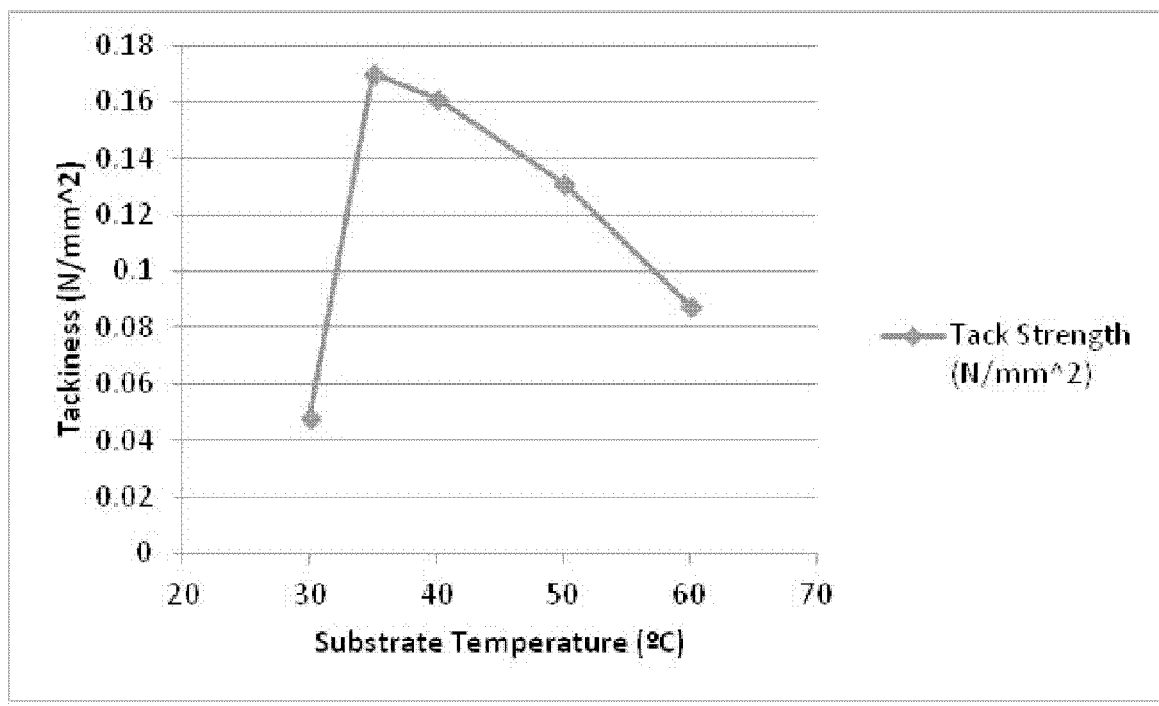
FIG. 3 shows a plot of tack strength versus substrate temperature.

In particular, as shown in FIG. 3, the applicant has found that the tackiness (or adhesion strength, measured in N/mm$^2$) of an example composite material increases above 30° C., and decreases from 40° C. to 60° C., with a trend showing that continued increases in temperature beyond 60° C. would reduce tackiness beyond an acceptable level (for example, below 0.05 N/mm$^2$).

Figure 4:
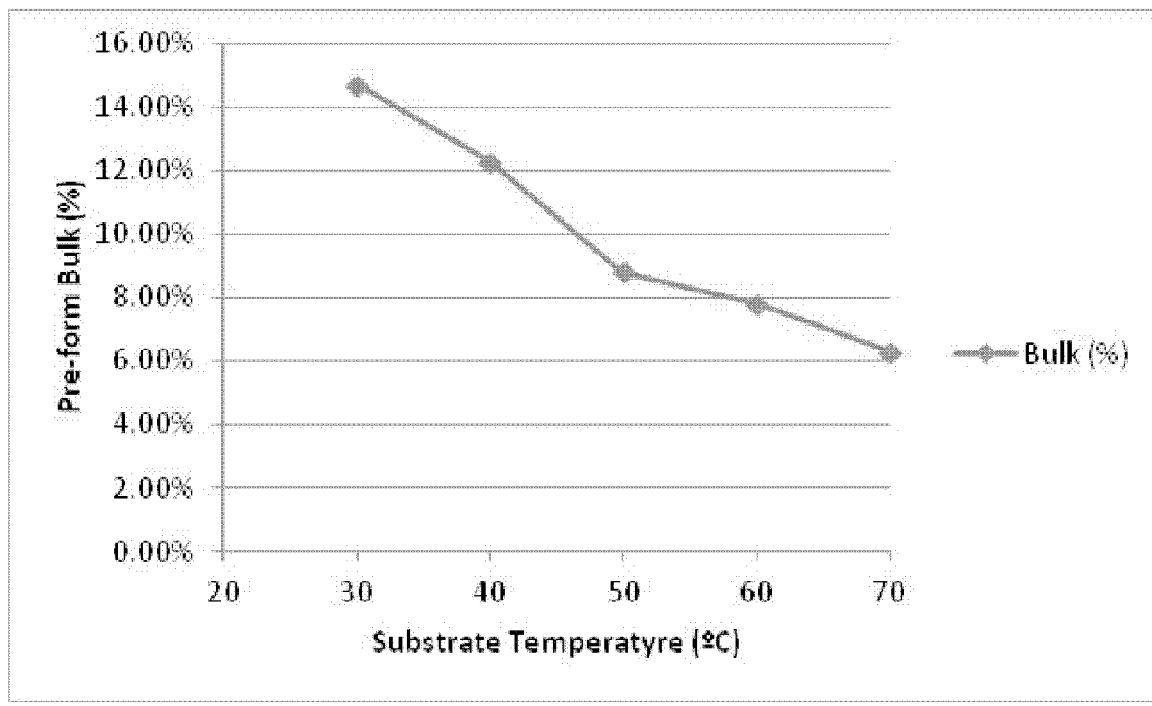
FIG. 4 shows a plot of bulk versus tool temperature.

Further, as shown in FIG. 4, the applicant has found that the pre-form bulk (measured in %) reduces with increasing substrate temperature. It is preferred for the bulk to be approximately 10% or less, which in the example of Figure corresponds to a substrate temperature of 45° C. or more.

Further still, the applicant has studied deposition quality, and concluded that deposition quality is generally acceptable in the range of 30° C.-60° C. substrate temperature. The applicant has monitored deposition quality by assessing factors such as out-of-plane features in the layed-up material, bridging or slipping of layed-up material, the material sticking to the roller rather than the substrate (i.e. the tool or the previous ply) or and the material becoming jammed in the applicator head.

Accordingly, it is desirable to provide heating to the pre-form during layup at a threshold temperature of at least 45° C., and preferably less than 60° C., in order to provide sufficient de-bulking whilst maintaining good tackiness and good deposition quality.

Whilst lay-up equipment is known that provides heating to composite material, this heating is only provided to improve tackiness and as such is only provided temporarily to the composite material for sufficient time for the material to tack, rather than for a prolonged period. As such, existing layup equipment typically only pre-heats the composite material, or heats it with a heater attached to the applicator head, and only to a temperature up to approximately 35° C. but typically less (e.g. 25° C.). Further, as shown in FIG. 3, there may be a peak tackiness at 35° C.

Accordingly, the invention of providing heating during layup to a threshold temperature of at least 45° C. results in reduced bulk, whilst still allowing good tackiness properties.

In the foregoing description, steps of a method have been identified using reference numerals in parentheses, whereas physical and simulated articles, such as the component tool 14, have been identified using reference numerals without parentheses.

The invention claimed is:

1. A method of manufacturing a composite component, the method comprising laying-up a plurality of successive plies of composite material on a tool to produce a pre-form for the composite component in a lay-up procedure, wherein a portion of each ply of composite material is heated to at least a threshold temperature of 45° C. during a period of the lay-up procedure during lay-up of the plies;

wherein a heating apparatus is controlled to heat the pre-form during the lay-up procedure by heat transfer from the tool to the pre-form and by heat transfer from a side of the pre-form opposite the tool;

wherein the heating apparatus has a first heater configured to heat the pre-form during the lay-up procedure by heat transfer from the tool to the pre-form, and a second heater configured to heat the pre-form during the lay-up procedure by heat transfer from the side of the pre-form opposite the tool;

wherein the heating apparatus is operated during the lay-up procedure during lay-up of the plies to heat the pre-form in a first heating phase in which a thickness of the pre-form is less than a threshold thickness or a number of plies is less than a threshold number of plies, and is subsequently operated during lay-up of plies in a second heating phase in which the pre-form has a thickness greater than or equal to the threshold thickness or a number of plies greater than or equal to the threshold number of plies;

wherein in the first heating phase only the first heater is active; and wherein in the second heating phase at least the second heater is active.

2. A method according to claim 1, wherein a portion of each ply of composite material is heated using the heating apparatus, and wherein the heating apparatus is operated so that the temperature of each ply is at least the threshold temperature for at least a pre-determined de-bulk period during the lay-up procedure.

3. A method according to claim 2, wherein the heating apparatus is operated so that the temperature of each ply is no more than 60° C. for the duration of the lay-up procedure.

4. A method according to claim 1, further comprising monitoring the temperature of the pre-form during the lay-up procedure.

5. A method according to claim 4, wherein the temperature of the pre-form is monitored using a pyrometer.

6. A method according to claim 4, wherein the heating apparatus is controlled at least partly based on monitoring the temperature of the pre-form during the lay-up procedure.

7. A method according to claim 1, wherein the heating apparatus comprises a heater element coupled to the tool and configured to heat the tool.

8. A method according to claim 1, wherein the heating apparatus comprises a non-contact heater.

9. A method according to claim 8, wherein the plies of composite material are layed-up using an applicator head, and wherein the applicator head moves relative to the non-contact heater during the lay-up procedure.

10. A method according to claim 9, wherein the non-contact heater is controlled to move during the lay-up procedure based on the proximity of the applicator head to the non-contact heater.

11. A method according to claim 10, wherein the non-contact heater is coupled to a proximity sensor configured to determine when the applicator head is within a threshold proximity of the non-contact heater, and wherein the non-contact heater is controlled to move based on an output of the proximity sensor.

12. A method according to claim 9, further comprising controlling the movement of the non-contact heater based on a predetermined path of the applicator head.

13. A method according to claim 1, wherein in both the first heating phase and the second heating phase, heat is applied while plies are being applied to the tool.

14. A method according to claim 1, wherein a controller is configured to change between the first heating phase and the second heating phase while plies are being applied to the tool.

15. A method of manufacturing a composite component, the method comprising laying-up a plurality of successive plies of composite material on a tool to produce a pre-form for the composite component in a lay-up procedure, wherein a portion of each ply of composite material is heated to at least a threshold temperature of 45° C. during a period of the lay-up procedure during lay-up of the plies;
- wherein a heating apparatus is controlled to heat the pre-form during the lay-up procedure by heat transfer from the tool to the pre-form and by heat transfer from a side of the pre-form opposite the tool;
- wherein the heating apparatus has a first heater configured to heat the pre-form during the lay-up procedure by heat transfer from the tool to the pre-form, and a second heater configured to heat the pre-form during the lay-up procedure by heat transfer from the side of the pre-form opposite the tool;
- wherein the heating apparatus is operated during the lay-up procedure during lay-up of the plies to heat the pre-form in a first heating phase in which a thickness of the pre-form is less than a threshold thickness or a number of plies is less than a threshold number of plies, and is subsequently operated during lay-up of plies in a second heating phase in which the pre-form has a thickness greater than or equal to the threshold thickness or a number of plies greater than or equal to the threshold number of plies;
- wherein in the first heating phase only the second heater is active;
- wherein in the second heating phase both the first heater and the second heater are active.

16. Composite material lay-up equipment comprising:
- a tool for receiving a plurality of successive plies of composite material in a lay-up procedure to form a pre-form for a composite component;
- a heating apparatus for heating the pre-form on the tool; and
- a controller configured to control the heating apparatus so that a portion of each ply of composite material is heated to at least a threshold temperature of 45° C. during a period of the lay-up procedure during lay-up of the plies;
- the heater apparatus comprises a first heater configured to heat the pre-form during the lay-up procedure by heat transfer from the tool to the pre-form, and a second heater configured to heat the preform during the lay-up procedure by heat transfer from a side of the pre-form opposite the tool;
- wherein the first heater and the second heater are coupled to the controller, and the controller is configured to:
- monitor the lay-up procedure to determine once the pre-form has reached a threshold thickness or threshold number of plies;
- activate only the first heater during lay-up of plies in a first heating phase in which a thickness of the pre-form is less than the threshold thickness, or a number of plies is less than the threshold number of plies;
- subsequently activate at least the second heater during lay-up of plies in a second heating phase in which the pre-form has a thickness greater than or equal to the threshold thickness, or a number of plies is greater than or equal to the threshold number of plies;
- whereby the heating apparatus is controlled to heat the pre-form during the lay-up procedure by heat transfer from the tool to the pre-form and by heat transfer from the side of the pre-form opposite the tool.

17. Composite material lay-up equipment according to claim 16, further comprising a temperature sensor configured to generate a signal relating to the temperature of the pre-form during the lay-up procedure;
- wherein the controller is configured to control the heating apparatus based on the output of the temperature sensor.

18. Composite material lay-up equipment according to claim 16, further comprising a proximity sensor configured to determine when an applicator head of the composite material lay-up equipment is within a threshold proximity of the second heater which is a non-contact heater, and wherein the equipment is arranged to move the non-contact heater based on an output of the proximity sensor
- wherein the non-contact heater is configured to move during the lay-up procedure based on the proximity of the applicator head to the non-contact heater.

* * * * *